UNITED STATES PATENT OFFICE.

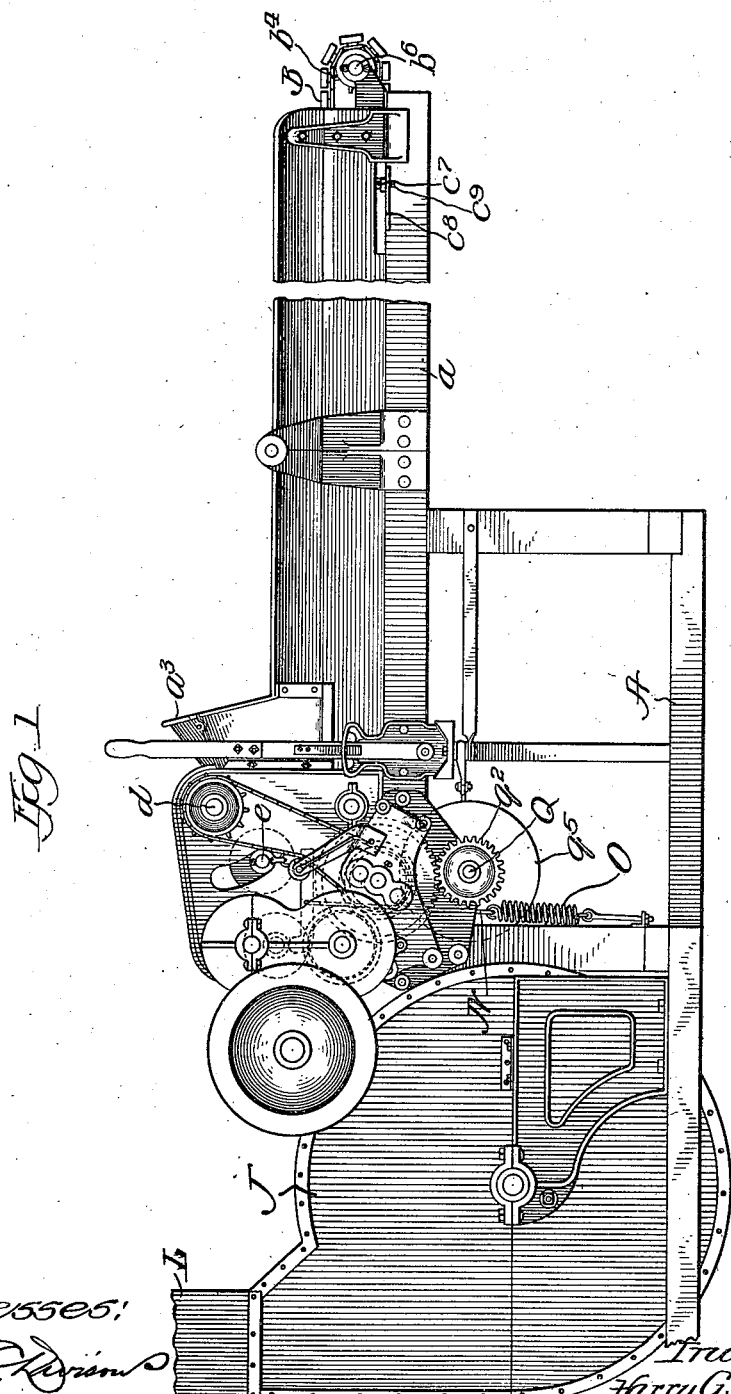

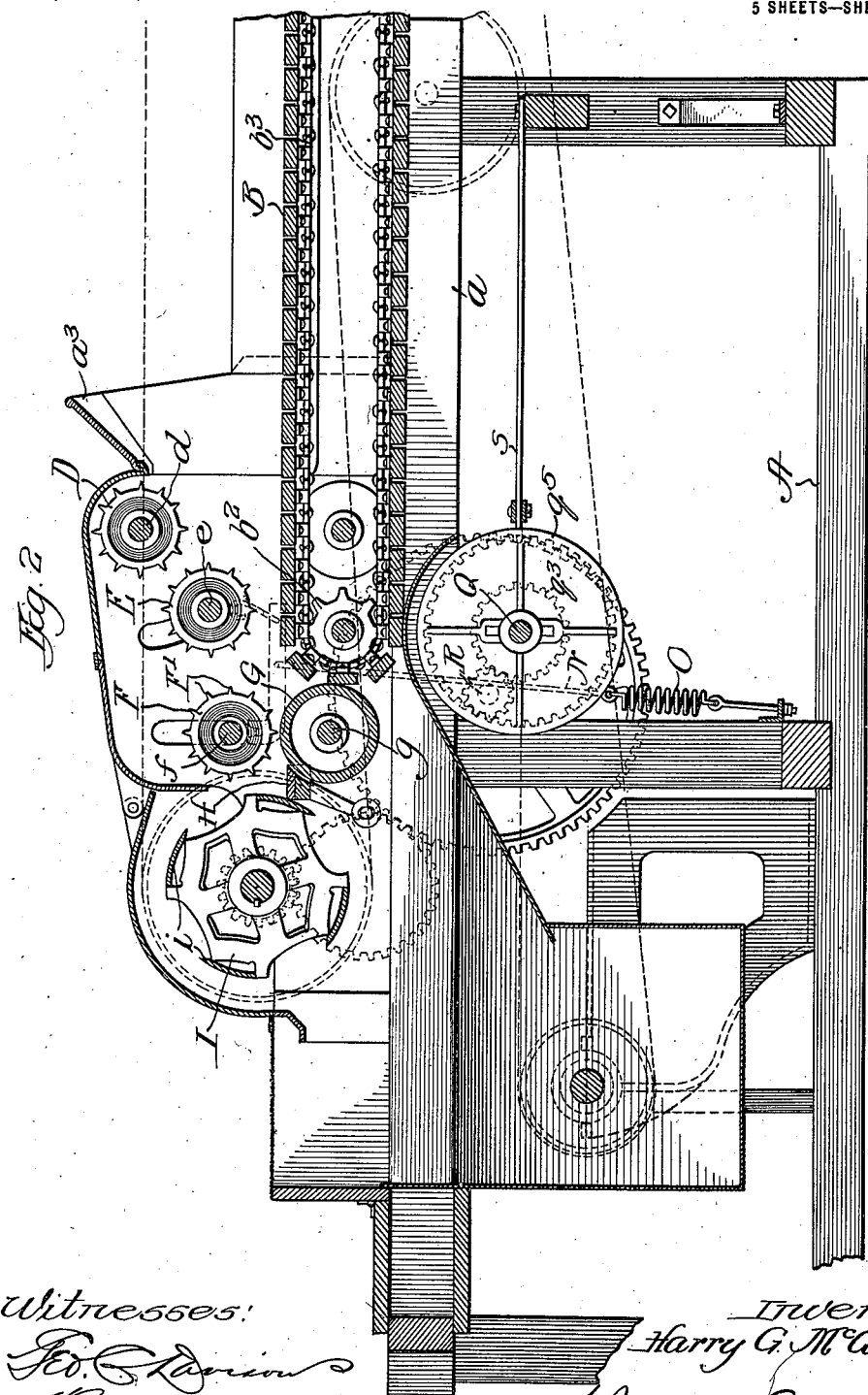

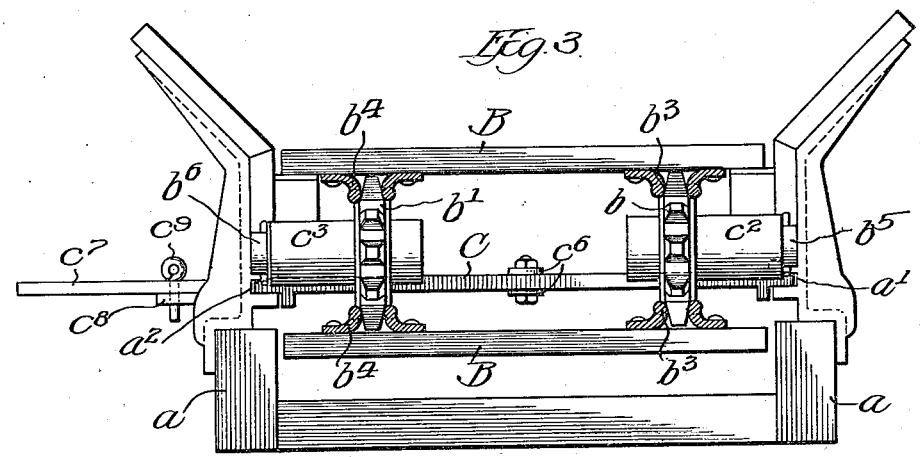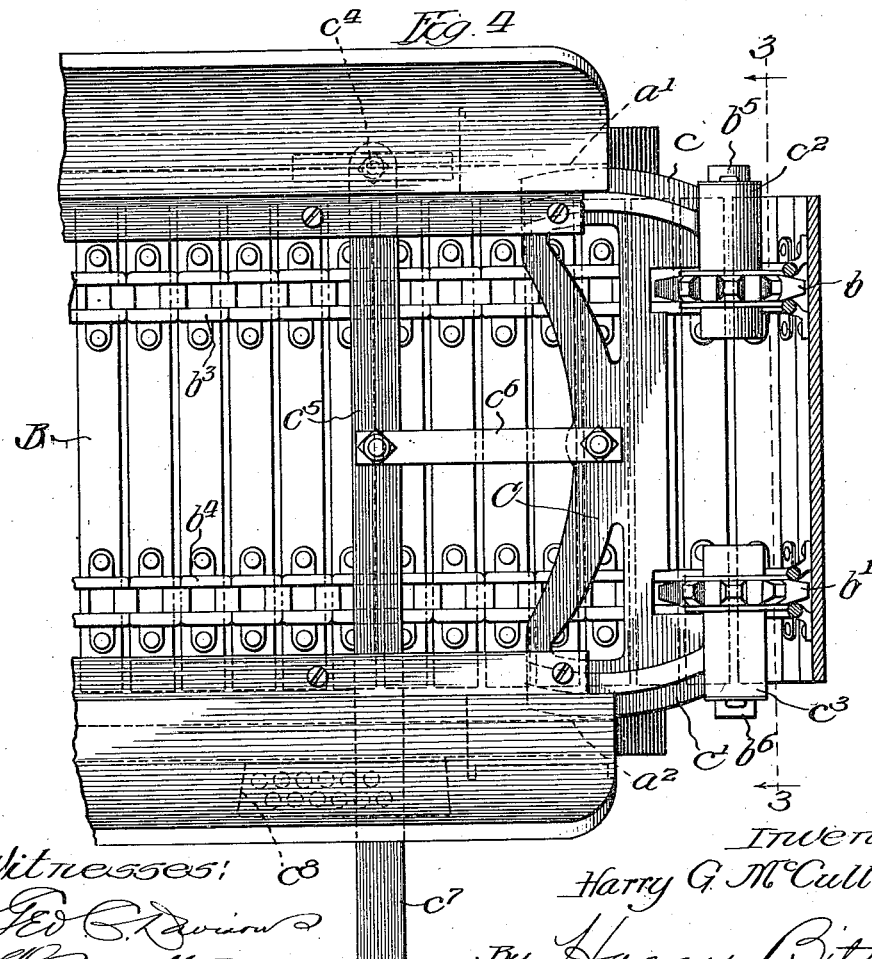

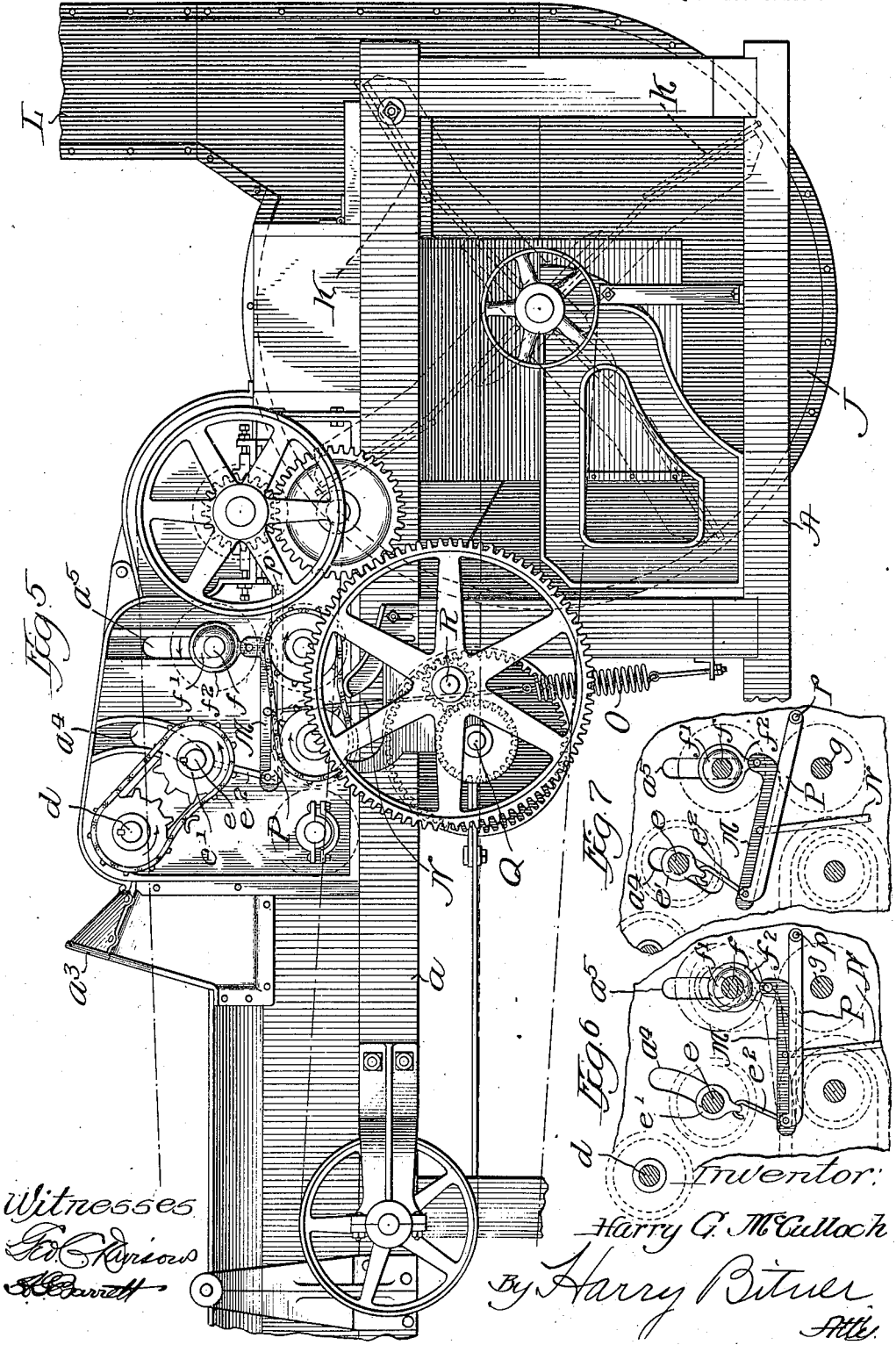

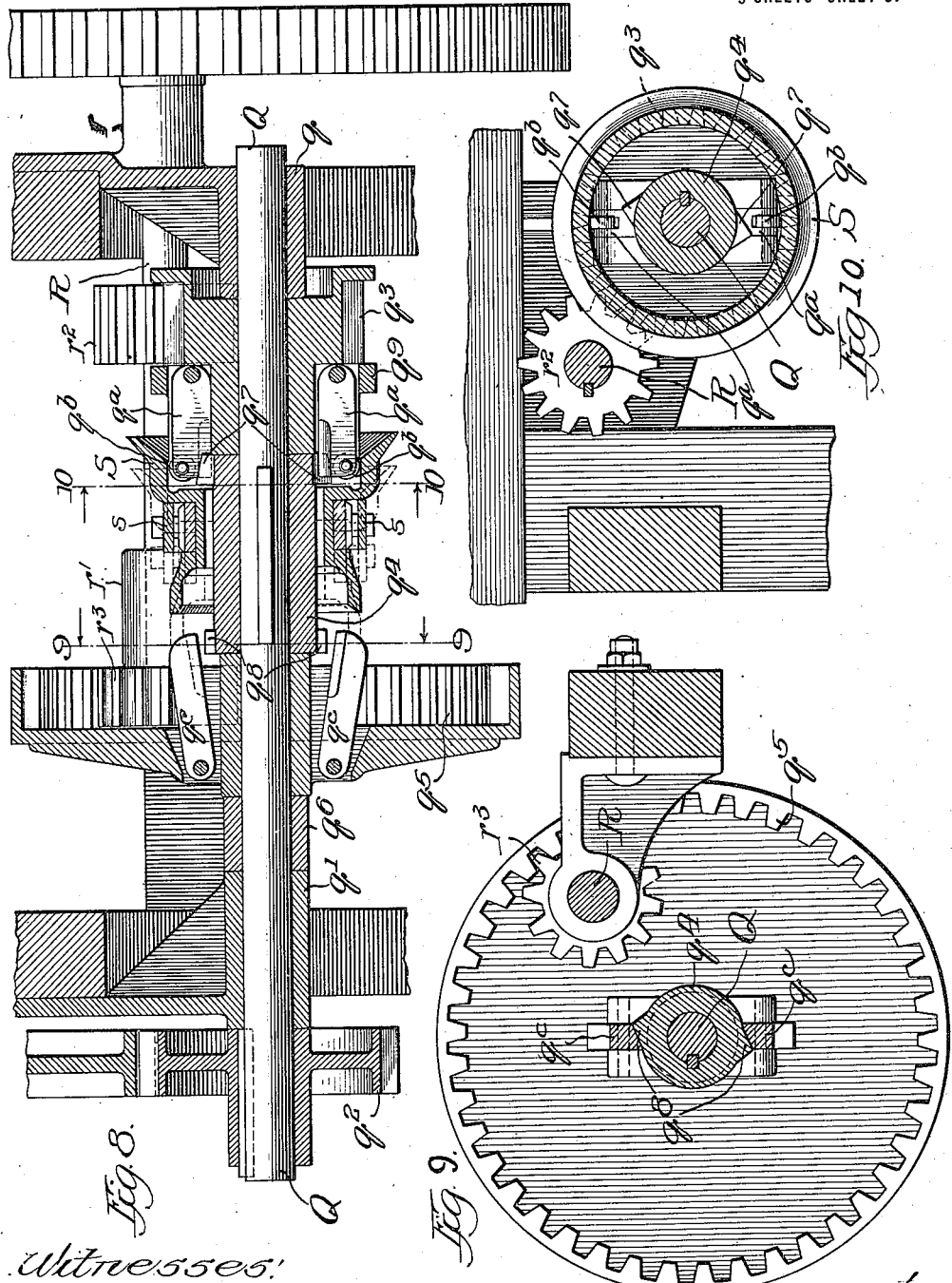

HARRY G. McCULLOCH, OF FREEPORT, ILLINOIS, ASSIGNOR TO STOVER MANUFACTURING COMPANY, OF FREEPORT, ILLINOIS, A CORPORATION OF ILLINOIS.

ENSILAGE-CUTTER.

1,204,579.　　　　　Specification of Letters Patent.　　Patented Nov. 14, 1916.

Application filed February 26, 1914. Serial No. 821,323.

*To all whom it may concern:*

Be it known that I, HARRY G. McCULLOCH, residing at Freeport, in the county of Stephenson and State of Illinois, have invented certain new and useful Improvements in Ensilage-Cutters, of which the following is a specification.

My invention relates to certain improvements applied to an ensilage cutter for the purpose of increasing the capacity of the same without increasing the size of the machine. It has to do principally with the feeding apparatus, the various devices of which that apparatus is composed and the mechanisms for quickly and surely starting, controlling and reversing said apparatus.

To make a machine of the greatest capacity in proportion to its size it is essential that the automatic feeding devices be regular and effective in all positions and regardless of the quantity of material that is crowded into them. The materials to be cut are ordinarily fed to the machine by hand and it is, therefore, impossible to keep any certain quantity within reach of the feeding devices so that the latter must to a certain extent operate without regard to the quantity of material that is passing through them. Furthermore the same unevenness of hand feeding makes it necessary that the controlling and feed reversing devices be quick and sure so that choking of the material may be prevented and the consequent loss of time always due thereto. The quick reversing and powerful action of the feed devices causes a great tendency for said devices to get out of order and it is therefore essential that they be so mounted and arranged in the machine that the ordinary danger of disarrangement may be removed as far as possible.

In the drawings Figure 1 is a side elevation of a complete ensilage cutter except that the feed table has a part of its middle portion broken away to shorten the view; Fig. 2 is a vertical longitudinal section omitting the projecting end of the feed table; Fig. 3 is a vertical transverse section in the plane 3—3 of Fig. 4; Fig. 4 is a plan view of the projecting end of the feed table; Fig. 5 is a side elevation opposite from Fig. 1, omitting a portion of the feed table; Fig. 6 is a detail view of certain parts shown in Fig. 5; Fig. 7 is a similar view showing said parts in a different position; Fig. 8 is a vertical transverse section through the feed reversing and controlling mechanism; Fig. 9 is a section in the plane 9—9 of Fig. 8 looking in the direction of the arrows 9, 9 and Fig. 10 is a section in the plane 10—10 of Fig. 8 looking in the direction of the arrows 10, 10.

In these drawings A represents a suitable frame-work supporting the various parts of the machine and carrying a projecting feed table, $a$, upon which the operator throws the material to be cut and from which it is fed into the machine. This material is advanced toward the mouth of the machine by means of an endless apron, B, carried at its respective ends upon sprocket wheels, two of which, $b$, $b^1$, are shown in Fig. 4 and the third, $b^2$, is shown in Fig. 2. The fourth sprocket which is arranged opposite to the sprocket $b^2$ and upon the same shaft is in front of the section plane of Fig. 2 and hence is not seen in that view. In running an endless feed apron of this sort at high speed and with heavy work it is absolutely necessary in order to attain the greatest capacity for the machine that the chains run over the sprockets with the proper tension and the proper balance with respect to each other. Otherwise unnecessary strain is imposed upon the parts and in some cases the chains climb up the sprocket teeth and run off of the same, often doing serious damage to the apron and always causing considerable delay. To meet the requirements of this class of work I have arranged a combined equalizer and adjusting device at the projecting end of the feed table so guided and supported thereon as to automatically equalize the tension of the two chains and at the same time afford easy and convenient means for instantly adjusting said tension to varying conditions.

Referring to Fig. 4 it should be noticed that the upper portion of the endless apron B is removed disclosing the lower halves of the two endless chains which are lettered respectively $b^3$ and $b^4$. In the end portion of the feed table and upon opposite sides thereof are segment shaped guides or ways, $a^1$, $a^2$, in which is guided an equalizing frame, C, provided with opposite segment shaped ends, $c$, $c^1$, fitted to the ways and moving freely therein. Upon the opposite ends of this frame are supported two bearings, $c^2$, $c^3$, in which are journaled shafts $b^5$, $b^6$, upon which sprockets $b$, $b^1$, are carried.

At one side of the feed table and upon a suitable pivot, $c^4$, is secured an adjusting lever, $c^5$, the middle portion of which is connected by links, $c^6$, to the middle of the frame C and the handle portion of which, $c^7$, extends laterally from the opposite side of the machine in convenient position to be grasped by the hand. Upon this side of the feed table is secured a perforated plate, $c^8$, and the handle $c^7$ may be secured in any one of a number of adjustments upon said plate by means of a pin, $c^9$, Fig. 3.

When on account of the varying conditions as to weather or work the chains become either too tight or too loose the fault is corrected by adjusting the lever $c^5$ and securing it in position by means of the pin $c^9$. When this is done the frame C equalizes the strain upon the two sprockets so that both are stretched to the same tension and to exactly the tension required for the best running and greatest efficiency.

When the fodder is thrown upon the feed table it falls upon the endless apron B, the upper portion of which runs toward the mouth of the machine, shown at $a^3$, see Fig. 2. Here it first encounters, before it leaves the feed table, a packing roll, D, which will be called a stationary roll because it is mounted upon a shaft, $d$, running in bearings which are fixed with relation to the frame of the machine. This stationary roll packs the fodder slightly, pressing it downward and toward a movable packing roll, E, which presses the fodder down upon the endless apron and coöperates with the latter to advance it to the feed rolls, F, G. The feed roll G is preferably a smooth roll and the feed roll F which is movable toward and from the smooth roll is provided with longitudinal ribs, $F^1$, which are also preferably used upon the rolls, E, D. The rolls F, G, co-act to tightly pack the fodder between them and feed it forcibly and regularly over the stationary knife H to the cutting knives, $i$, upon the cutter head, I, suitably mounted in the machine. Beneath the cutter head and preferably at one end of the frame is a fan case, J, in which a fan or blower, K, shown in dotted lines in Fig. 5, rotates to throw the cut feed up through the spout, L, which leads to the silo or other receptacle therefor.

The shaft of the roll G is lettered $g$ and rotates in bearings which are preferably fixed with relation to the frame but the shaft of the roll F which is lettered $f$ and the shaft of the roll E which is lettered $e$, run in movable bearings so that said rolls may move up and down to accommodate themselves to the quantity of fodder which is passing beneath them. As the latter travels forward on the endless apron it is slightly packed by the roll D and the roll E easily crowds it downward between it and the feed table, rising if necessary to ride over it and pass it onward to the feed rolls F, G. It reaches these rolls in a firmly packed condition and it is desirable that there be a slight preliminary opening between these rolls to allow the fodder to enter them freely. Looking at Figs. 5, 6 and 7 it will be seen that the shafts $e$, $f$, run in bearings, $e^1$, $f^1$, guided by slots, $a^4$, $a^5$, in the frame and connected by hooks, $e^2$, $f^2$, with a bar, M, the middle portion of which is connected by a link, N, with a spring, O, secured to the frame and exerting the required downward pull upon the two floating rolls. The lower end of the hook $e^2$ is also pivoted to a bar, P, which passes beneath the pivot portion of the link N and is pivoted to the frame at $p$. It should be understood of course that the devices just described which exert the downward pull upon the two floating rolls are supplied upon the opposite side of the machine so that the pull upon the ends of said rolls is evenly balanced. As the fodder passes beneath these floating rolls they rise against the tension of the springs O and it will be seen from Figs. 6 and 7 that the upward movement of the roll E brings the bar P in contact with the pivot portion of the link N, lifting the bar M and raising the roll F to permit the fodder to pass readily beneath the same. This operation does not interfere with the further rising of the roll F if the same may be necessary as the fodder crowds beneath it because such additional upward movement of the roll F merely raises the pivot end of the link N from the bar P.

In feeding one of these machines to the limit of its capacity it frequently happens that too much fodder is crowded into the feed rolls or an unusually tough bundle gets into the machine and either chokes the same or throws such a strain upon the working parts thereof that it is desirable to reverse the feed and immediately relieve the machine from the excess load. This necessity for reversing the feed invariably comes when there is the greatest strain upon whatever sort of clutch mechanism is provided for releasing or reversing the feed gear and it is therefore desirable that the clutch mechanism be such that the thrust of the engaging parts thereof shall not act to increase the resistance of disengagement.

In my preferred reversing gear two shafts are employed, the ends of which are seen at Q, R, in Fig. 5 and the opposite end of the shaft Q is seen in Fig. 1 at Q. With reference to this reversing gear the shaft R is the driving shaft and the shaft Q is the driven shaft. The shaft R receives the power through suitable gearing from the main driving gear and transmits it through the reversible gear to the shaft Q which passes it on to the feed mechanism through suitable gearing upon the opposite side of the machine.

Referring now to Fig. 8, the shaft R is seen to be journaled in suitable bearings, $r$ $r^1$. Between these bearings it carries a pinion, $r^2$, Figs. 8 and 10, and it extends beyond the bearing $r^1$ only far enough to carry a second pinion, $r^3$, Fig. 9. The driven shaft Q is mounted alongside the shaft R in suitable bearings, $q$, $q^1$, and beyond the latter has fast upon it a pinion, $q^2$, which transmits the power to the feed mechanism, the direction of rotation of said pinion being determined by the position of the parts of the clutch mechanism upon the shaft Q. Between the bearings $q$, $q^1$, the shaft Q carries a loose pinion, $q^3$, a collar, $q^4$, secured against rotation upon the shaft, a loose internal gear, $q^5$, and a collar, $q^6$, occupying the space between the hub of the internal gear and the bearing $q^1$. All of these parts are held against longitudinal movement upon the shaft and the collar $q^4$ only is held against rotation. The pinion $r^2$ meshes with the spur gear $q^3$ and the pinion $r^3$ meshes with the internal gear $q^5$. This causes the gears $q^3$, $q^5$, to rotate in opposite directions so that the direction of rotation of the shaft Q will be determined by whichever one of these two gears happens to be locked in engagement therewith.

Upon the opposite ends of the collar $q^4$ are radially projecting tapered lugs, $q^7$, $q^7$, seen in end elevation in Fig. 10, and $q^8$, $q^8$, seen in vertical transverse section in Fig. 9. Upon an extension, $q^9$, of the hub of the gear $q^3$ are pivoted two radially swinging arms, $q^a$, $q^a$, the swinging ends of which may be brought into engagement with the tapered lugs $q^7$, $q^7$, by means of the bell shaped end of a sliding collar, S, guided against rotation upon the collar $q^4$ and moved thereon or held in position with relation thereto by means of a common clutch-operating yoke $s$ without novelty and shown only in Fig. 8. Anti-friction rolls, $q^b$, $q^b$, mounted in the swinging ends of the arms engage the interior of the bell to make the act of engaging or disengaging these parts as easy as possible. Such engagement exists when the machine is working and the greatest strain therefore is thrown upon the clutch and the greatest resistance offered to the quick disengagement thereof.

The hub of the internal gear $q^5$ is provided with opposite radially swinging arms, $q^c$, $q^c$, which may be brought into engagement with the tapered lugs $q^8$ by means of a bell shaped extension upon the opposite side of the collar S.

This collar S may be moved into and secured in any of three positions by moving the clutch yoke $s$ in the usual way into one or another of three positions. The position shown in Fig. 8 effects the engagement of the spur gear $q^3$ with the shaft Q and transmits the power to the feed mechanism in the direction maintained when the machine is in operation. An intermediate position of the collar S is shown in dotted lines and when the collar occupies this position the swinging arms are forced out of engagement with the collar $q^4$ by the tapered lugs thereon and held out of engagement and out of contact therewith by the centrifugal force created by the rotation of the gears upon which these swinging arms are carried. If the collar S is moved into the extreme position to the left in Fig. 8 it engages the swinging arms $q^c$, $q^c$, with the tapered lugs, $q^8$, $q^8$, and throws the internal gear $q^5$ into engagement with the shaft Q. This causes the rotation of the shaft in an opposite direction and reverses the entire feeding gear to relieve the machine from whatever undue strain has been thrown upon it. It should be noticed that the difference in size of the spur gear $q^3$ and the internal gear $q^5$ causes the feeding mechanism to move much more slowly when reversed than when in ordinary operation.

The various parts above described and the arrangement thereof are capable of great variation without destroying the main advantages thereof and I do not desire to limit my invention to the exact construction above described except as particularly set forth in the following claims in which it is my intention to cover all of the patentable novelty contained in my invention in view of the prior art.

I claim as new and desire to secure by Letters Patent—

1. In a machine of the class described the combination with a suitable frame and driving gear of a pair of floating feed rolls, a lever connected near its respective ends with the respective rolls and, midway, with a yielding support and a connection between said feed rolls and the frame actuated by one of said rolls to give a limited movement to the other.

2. In a machine of the class described the combination with a suitable frame and driving gear of a traveling feed apron, a stationary lower feed roll in line with said apron, a cutter beyond said feed roll, a stationary upper feed roll opposed to said apron at a suitable distance therefrom, a floating upper feed roll opposed to said lower feed roll, a floating upper feed roll opposed to said apron between the stationary upper feed roll and the lower feed roll and yielding supporting devices connecting said two floating feed rolls, permitting independent vertical movement thereof and giving a slight preliminary movement to the floating roll nearest the cutter when actuated by the other floating roll.

In witness whereof I have signed the above applications for Letters Patent at Freeport, Illinois, this 13th day of February, A. D. 1914.

HARRY G. McCULLOCH.

Witnesses:
J. F. DITTMAN,
ROBT. BAST.